United States Patent
Asukai

(10) Patent No.: US 8,610,386 B2
(45) Date of Patent: Dec. 17, 2013

(54) BRUSHLESS MOTOR DRIVE CIRCUIT AND BRUSHLESS MOTOR DRIVE SYSTEM

(75) Inventor: Tadashi Asukai, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 351 days.

(21) Appl. No.: 13/048,177

(22) Filed: Mar. 15, 2011

(65) Prior Publication Data
US 2012/0032621 A1    Feb. 9, 2012

(30) Foreign Application Priority Data

Aug. 9, 2010   (JP) ................................ 2010-178597

(51) Int. Cl.
*H03K 5/00* (2006.01)

(52) U.S. Cl.
USPC ............. 318/400.13; 318/400.14; 318/400.09

(58) Field of Classification Search
USPC .......... 318/400.13, 400.14, 400.09, 439, 618, 318/621, 700, 701, 720, 721
See application file for complete search history.

(56) References Cited

U.S. PATENT DOCUMENTS

| | | | |
|---|---|---|---|
| 5,838,123 A * | 11/1998 | Zhao | 318/400.14 |
| 7,064,517 B2 | 6/2006 | Kiuchi et al. | |
| 7,109,672 B1 | 9/2006 | Mushika et al. | |

FOREIGN PATENT DOCUMENTS

| | | |
|---|---|---|
| JP | 11-215880 | 8/1999 |
| JP | 11-275889 | 10/1999 |
| JP | 2001-276467 | 10/2001 |
| JP | 2005-168797 | 6/2005 |
| JP | 2006-353026 | 12/2006 |
| JP | 2008-236892 | 10/2008 |
| JP | 2008-306906 | 12/2008 |

OTHER PUBLICATIONS

Translation of Official Action of Notification of Reason for Rejection for Japanese Patent Application No. 2010-178597 Dated Feb. 5, 2013, 6 pgs.

* cited by examiner

*Primary Examiner* — Karen Masih
(74) *Attorney, Agent, or Firm* — White & Case LLP

(57) ABSTRACT

A brushless motor drive circuit has a first AD converter which converts a voltage value depending upon a power supply voltage supplied from a power supply to drive a three-phase brushless motor, to a digital signal and outputs the digital signal. The brushless motor drive circuit has an energization timing adjustment circuit which outputs an adjustment signal for adjusting a lead angle value or a lag angle value of energization timing of the three-phase brushless motor, in response to the digital signal which is output by the first AD converter. The brushless motor drive circuit has an energization timing setting circuit which sets the energization timing of the three-phase brushless motor.

16 Claims, 4 Drawing Sheets

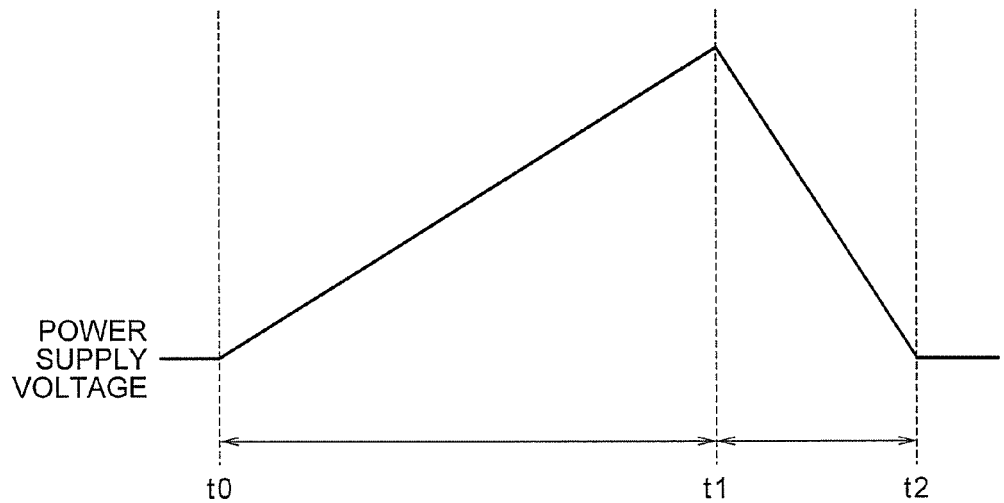

FIG.3

| POWER SUPPLY VOLTAGE Vd | STATE OF BRUSHLESS MOTOR DRIVE CIRCUIT |
|---|---|
| AT LEAST OVERVOLTAGE | ENERGIZATION OUTPUT LOW(OFF) |
| AT LEAST THIRD THRESHOLD | ORDINARY LEAD ANGLE+ THIRD STEP OF LEAD ANGLE |
| AT LEAST SECOND THRESHOLD | ORDINARY LEAD ANGLE + SECOND STEP OF LEAD ANGLE |
| AT LEAST FIRST THRESHOLD | ORDINARY LEAD ANGLE + FIRST STEP OF LEAD ANGLE |
| LESS THAN FIRST THRESHOLD | ORDINARY LEAD ANGLE |

BRUSHLESS MOTOR DRIVE CIRCUIT AND BRUSHLESS MOTOR DRIVE SYSTEM

CROSS-REFERENCE TO RELATED APPLICATION

This application is based upon and claims the benefit of priority from the prior Japanese Patent Application No. 2010-178597, filed on Aug. 9, 2010, the entire contents of which are incorporated herein by reference.

BACKGROUND

1. Field

Embodiments described herein relate generally to a brushless motor drive circuit and brushless motor drive system driving a three-phase brushless motor with sine wave signals.

2. Background Art

Conventionally, a current is regenerated to a power supply at the time of deceleration of sine wave drive of a brushless motor, resulting in an increase of a power supply voltage.

Therefore, it is necessary to design a configuration for driving a brushless motor considering a variation of the power supply voltage.

In other words, the conventional art has a problem that a power supply and parts which are high in withstand voltage must be used considering the variation of the power supply voltage and the variation of the power supply voltage exerts an influence upon the operation of the brushless motor as well.

BRIEF DESCRIPTION OF THE DRAWINGS

FIG. 3 is a diagram showing a relation between the deceleration control of the three-phase brushless motor and the power supply voltage in a brushless motor drive system in a comparative example;

FIG. 4 is a diagram showing an example of a relation between a control state of the brushless motor drive circuit 100 and the power supply voltage.

DETAILED DESCRIPTION

A brushless motor drive circuit according to an embodiment drives a three-phase brushless motor with sine wave signals. The brushless motor drive circuit has a first AD converter which converts a voltage value depending upon a power supply voltage supplied from a power supply to drive a three-phase brushless motor, to a digital signal and outputs the digital signal. The brushless motor drive circuit has an energization timing adjustment circuit which outputs an adjustment signal for adjusting a lead angle value or a lag angle value of energization timing of the three-phase brushless motor, in response to the digital signal which is output by the first AD converter. The brushless motor drive circuit has an energization timing setting circuit which sets the energization timing of the three-phase brushless motor. If a regenerated voltage is generated by decelerating the three-phase brushless motor with sine wave signals and the power supply voltage rises, then the energization timing setting circuit sets energization timing changed by the lead angle value or the lag angle value on the basis of the adjustment signal to further decelerate the three-phase brushless motor.

Hereafter, a brushless motor drive circuit brushless motor drive circuit according to the present invention will be described more specifically with reference to the drawings.

First Embodiment

Figure 1:
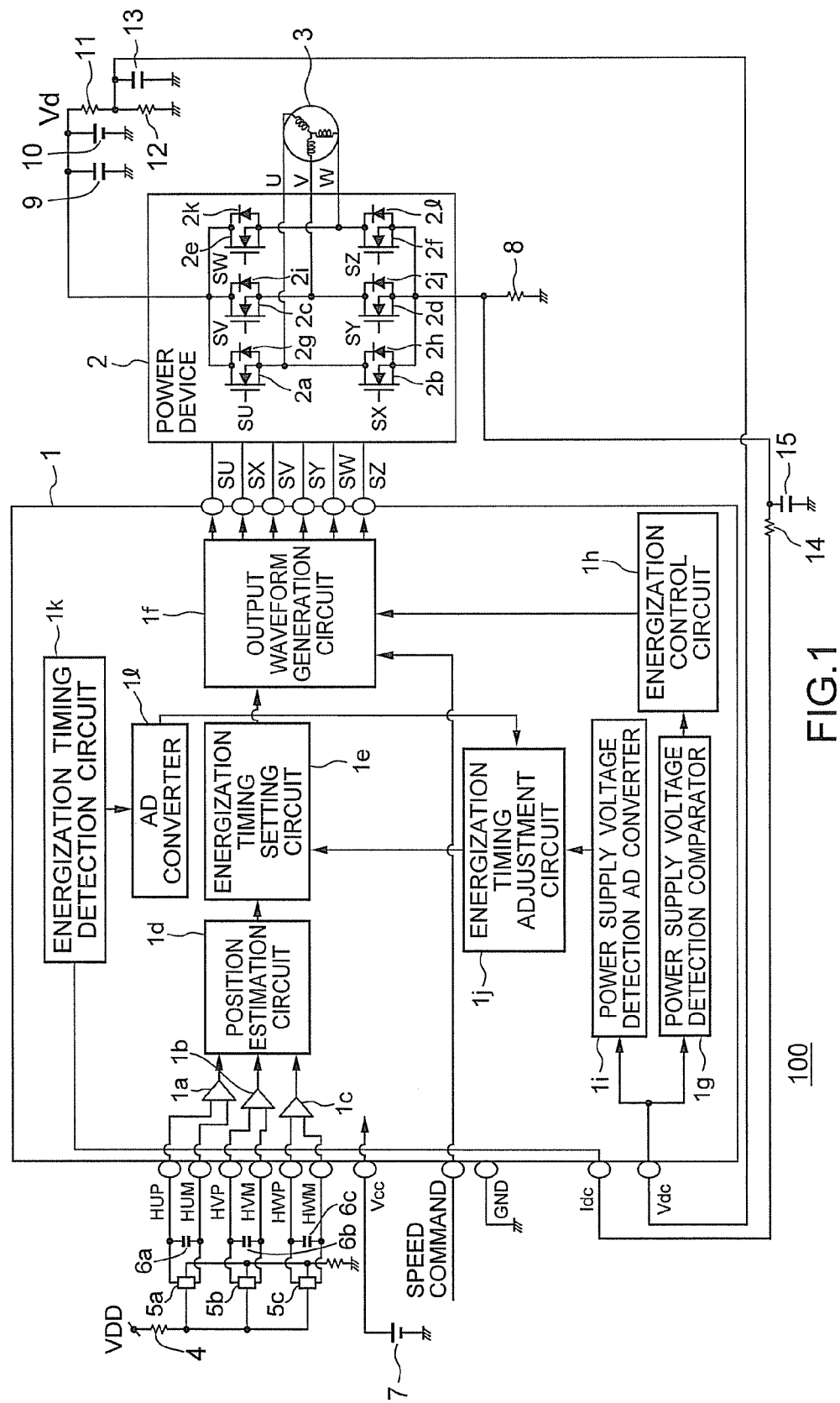
FIG. 1 is a diagram showing an example of a configuration of a brushless motor drive system 100 according to a first embodiment.

FIG. 1 is a diagram showing an example of a configuration of a brushless motor drive system 100 according to a first embodiment.

As shown in FIG. 1, the brushless motor drive system 100 includes a brushless motor drive circuit 1, a power device 2, a three-phase brushless motor 3, a resistor 4, first to third Hall devices 5a to 5c, first to third capacitors 6a to 6c, a DC power supply 7, a resistor 8, a capacitor 9, a DC power supply 10, voltage division resistors 11 and 12, a capacitor 13, a resistor 14, and a capacitor 15.

The first to third Hall devices 5a to 5c are respectively added to coils of respective phases (phase U, phase V and phase W) of the three-phase brushless motor 3. The first to third Hall devices 5a to 5c are adapted to output phase U Hall signals HUP and HUM, phase V Hall signals HVP and HVM, and phase W Hall signals HWP and HWM to the brushless motor drive circuit 1, respectively. Note that the signals HUM, HVM and HWM are signals obtained by inverting the signals HUP, HVP and HWP, respectively.

The first to third capacitors 6a to 6c are connected to outputs of the first to third Hall devices 5a to 5c, respectively.

The DC power supply 7 is adapted to output a voltage Vcc to the power device 2.

The DC power supply 10 is connected at its first end to the power device 2 and connected at its second end to ground. The DC power supply 10 generates a power supply voltage Vd to be supplied to the power device 2.

The voltage division resistors 11 and 12 are connected in series between the first end of the DC power supply 10 and the ground. The voltage division resistors 11 and 12 divides an output voltage (the power supply voltage Vd) of the DC power supply 10 and outputs a voltage Vdc obtained by the voltage division.

The capacitor 13 is connected between a node of the voltage division resistors 11 and 12 and the ground.

The resistor 14 is connected between a second end of the power device 2 and an input of the motor drive circuit 1. A current signal Idc depending upon a total current which flows to the power device 2 is input to the brushless motor drive circuit 1.

The capacitor 15 is connected between the second end of the power device 2 and the ground.

The power device 2 is connected at its first end to the DC power supply 10 and connected at its second end to the ground via the resistor 8. The power device 2 is adapted to supply the power supply voltage Vd to the three-phase brushless motor 3 with three-phase sine wave signals U, V and W in accordance with drive signals SU, SX, SV, SY, SW and SZ.

The power device 2 includes six nMOS transistors 2a to 2f and six diodes 2g to 2l.

The nMOS transistor 2a supplied at its gate with the drive signal SU as its input and the nMOS transistor 2b supplied at its gate with the drive signal SX as its input are connected in series between the DC power supply 10 and the ground. A terminal between the nMOS transistor 2a and the nMOS transistor 2b is connected to a phase U coil of the three-phase brushless motor 3. A sine wave signal U from the terminal is supplied to the phase U coil.

Note that the diode 2g is connected at its cathode to a drain of the nMOS transistor 2a and connected at its anode to a source of the nMOS transistor 2a. The diode 2h is connected at its cathode to a drain of the nMOS transistor 2b and connected at its anode to a source of the nMOS transistor 2a.

The nMOS transistor 2c supplied at its gate with the drive signal SV as its input and the nMOS transistor 2d supplied at its gate with the drive signal SY as its input are connected in series between the DC power supply 10 and the ground. A terminal between the nMOS transistor 2a and the nMOS transistor 2b is connected to a phase V coil of the three-phase brushless motor 3. A sine wave signal V from the terminal is supplied to the phase V coil.

Note that the diode 2i is connected at its cathode to a drain of the nMOS transistor 2c and connected at its anode to a source of the nMOS transistor 2c. The diode 2j is connected at its cathode to a drain of the nMOS transistor 2d and connected at its anode to a source of the nMOS transistor 2d.

The nMOS transistor 2e supplied at its gate with the drive signal SW as its input and the nMOS transistor 2f supplied at its gate with the drive signal SZ as its input are connected in series between the DC power supply 10 and the ground. A terminal between the nMOS transistor 2e and the nMOS transistor 2f is connected to a phase W coil of the three-phase brushless motor 3. A sine wave signal W from the terminal is supplied to the phase W coil.

Note that the diode 2k is connected at its cathode to a drain of the nMOS transistor 2e and connected at its anode to a source of the nMOS transistor 2e. The diode 2l is connected at its cathode to a drain of the nMOS transistor 2f and connected at its anode to a source of the nMOS transistor 2f.

The three-phase brushless motor 3 is adapted to be driven by currents flowing through three-phase coils in response to three-phase sine wave signals U, V and W.

The brushless motor drive circuit 1 is adapted to control the power device 2 (control the drive of the three-phase brushless motor 3 using the three-phase sine wave signals U, V and W).

As shown in FIG. 1, the brushless motor drive circuit 1 includes first to third amplifier circuit 1a to 1c, a position estimation circuit 1d, an energization timing setting circuit 1e, an output waveform generation circuit 1f, a power supply voltage detection comparator 1g, an energization control circuit 1h, a power supply voltage detection AD converter 1i, an energization timing adjustment circuit 1j, an energization timing detection circuit 1k, and an AD converter 1l.

The first to third amplifier circuits 1a to 1c are adapted to output signals obtained by respectively amplify a difference between the phase U Hall signals HUP and HUM, a difference between the phase V Hall signals HVP and HVM, and a difference between the phase W Hall signals HWP and HWM, respectively.

The position estimation circuit 1d is adapted to estimate a phase (a position of a rotor) of the three-phase brushless motor on the basis of the output signals of the first to third amplifier circuits 1a to 1c and output a signal depending upon a result of the estimation.

The power supply voltage detection AD converter 1i is supplied with the voltage Vdc which is obtained by conducting the voltage division on the power supply voltage Vd supplied from the DC power supply 10 to drive the three-phase brushless motor with the division resistors 11 and 12. And the power supply voltage detection AD converter 1i is adapted to convert a voltage value (the voltage Vdc) depending upon the power supply voltage Vd to a digital signal and output the digital signal.

If the power supply voltage Vd is at least a preset threshold, then the power supply voltage detection AD converter 1i is adapted to output the digital signal.

In other words, for example, if the power supply voltage Vd is at least a first threshold, then the power supply voltage detection AD converter 1i outputs a first digital signal corresponding to a first lead angle value or a first lag angle value.

In addition, for example, if the power supply voltage Vd is at least a second threshold which is higher than the first threshold, then the power supply voltage detection AD converter 1i outputs a second digital signal corresponding to a second lead angle value which leads the first lead angle value or a second lag angle value which lags behind the first lag angle value.

In addition, for example, if the power supply voltage Vd is at least a third threshold which is higher than the second threshold, then the power supply voltage detection AD converter 1i outputs a third digital signal corresponding to a third lead angle value which leads the second lead angle value or a third lag angle value which lags behind the second lag angle value.

As for the power supply voltage detection AD converter 1i, for example, the thresholds can be changed.

The energization timing detection circuit 1k is adapted to detect a current flowing through the power device 2 and output a detected signal depending upon a magnitude of the detected current. For example, if the detected current is zero, then the energization timing detection circuit 1k keeps the lead angle value or the lag angle value unchanged. If the detected current becomes great, then the energization timing detection circuit 1k outputs the detected signal to cause a change which increases the lead angle value or the lag angle value.

The AD converter 1l is adapted to convert the detected signal to a digital signal and output the digital signal.

The energization timing adjustment circuit 1j is adapted to output an adjustment signal for adjusting the lead angle value or the lag angle value of energization timing of the three-phase brushless motor 3, in response to the digital signal which is output by the power supply voltage detection AD converter 1i and the digital signal which is output by the AD converter 1l.

For example, the energization timing adjustment circuit 1j is adapted to add up the digital signal which is output by the power supply voltage detection AD converter 1i and the digital signal which is output by the AD converter 1l and output an obtained result as the adjustment signal. The energization timing adjustment circuit 1j is formed of, for example, an adder which adds up the digital signal which is output by the power supply voltage detection AD converter 1i and the digital signal which is output by the AD converter 1l and output the adjustment signal.

The energization timing setting circuit 1e is adapted to set energization timing of the three-phase brushless motor 3 on the basis of the phase of the three-phase brushless motor 3 which is estimated by the phase estimation circuit 1d.

If a regenerated voltage is generated by decelerating the three-phase brushless motor 3 with the sine wave signals U, V and W and consequently the power supply voltage Vd rises, then the energization timing setting circuit 1e sets the energization timing changed by the lead angle value or the lag angle value on the basis of the adjustment signal to further decelerate the three-phase brushless motor 3.

Figure 2:
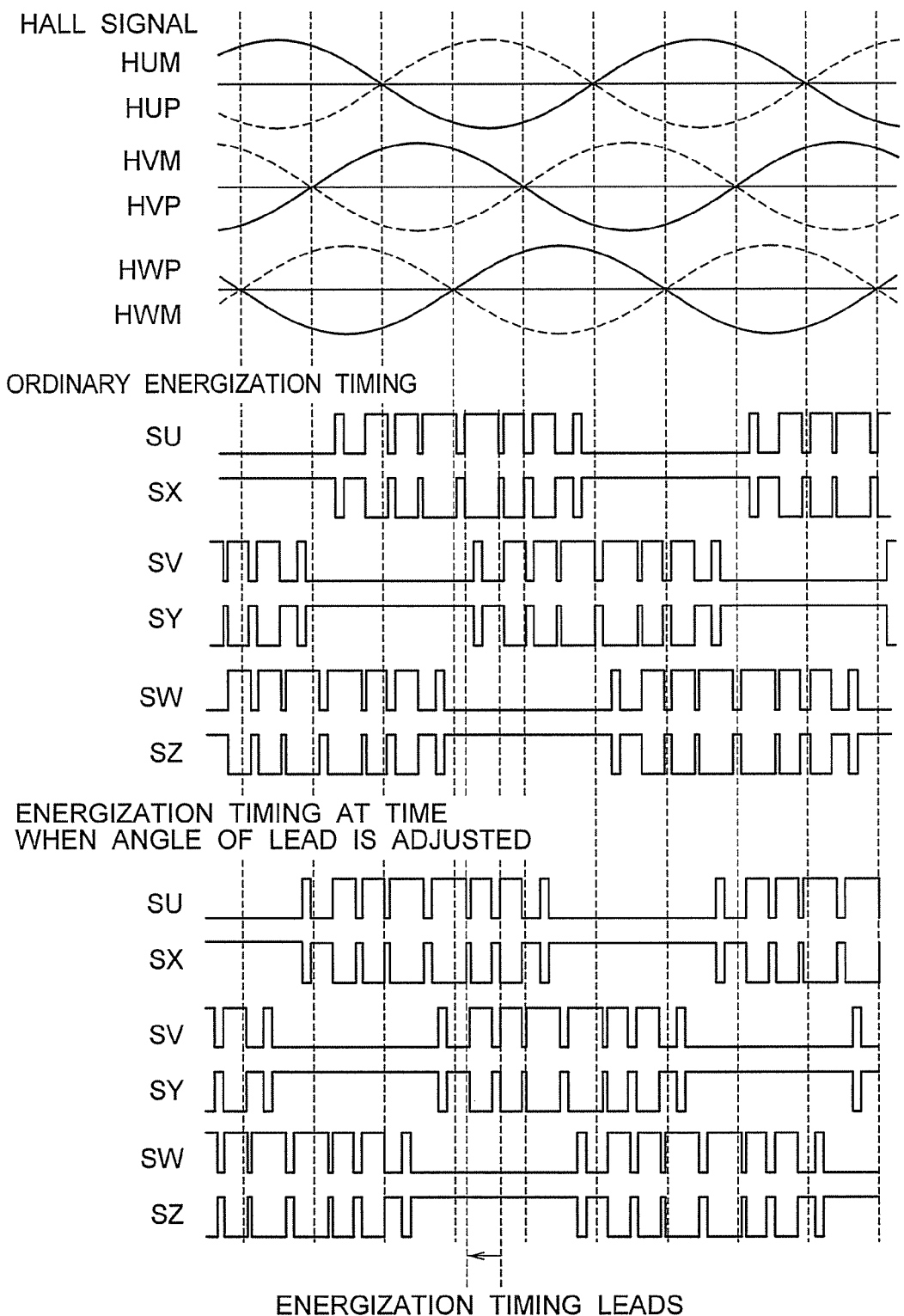
FIG. 2 is a diagram showing an example of waveforms of the Hall signals, waveforms of ordinary energization timing, and waveforms of energization timing adjusted in lead angle, in the brushless motor drive system 100 shown in FIG. 1.

FIG. 2 is a diagram showing an example of waveforms of the Hall signals, waveforms of ordinary energization timing, and waveforms of energization timing adjusted in lead angle, in the brushless motor drive system 100 shown in FIG. 1.

As shown in FIG. 2, for example, if the power supply voltage Vd rises, then the energization timing setting circuit 1e sets the energization timing changed by the lead angle value on the basis of the adjustment signal to further decelerate the three-phase brushless motor 3.

The output waveform generation circuit 1f is adapted to output drive signals SU, SX, SV, SY, SW and SZ for driving the three-phase brushless motor 3 on the basis of the energization timing which is set by the energization timing setting circuit and a speed command which is input from the external. For example, duty ratios, lead angle values and lag angle values of the drive signals SU, SX, SV, SY, SW and SZ are controlled, and consequently the speed of the three-phase brushless motor 3 is controlled.

Furthermore, the output waveform generation circuit 1f is adapted to output the drive signals SU, SX, SV, SY, SW and SZ to intercept the three-phase brushless motor 3 from the DC power supply 10 in response to a control signal which is output from the energization control circuit 1h and which will be described later. Note that for intercepting the three-phase brushless motor 3 from the DC power supply 10, for example, the nMOS transistors 2a, 2c and 2e in the power device 2 may be turned off to intercept all coils in the three-phase brushless motor 3 from the DC power supply 10, or the nMOS transistors 2a, 2c and 2e in the power device 2 may be turned off and the nMOS transistors 2b, 2d and 2f in the power device 2 may be turned on to ground all coils included in the three-phase brushless motor 3.

As a result, regeneration of the current to the DC power supply 10 caused by the rotation of the three-phase brushless motor 3 is controlled, and consequently the rise of the power supply voltage Vd is suppressed.

The power supply voltage detection comparator 1g is supplied with the voltage Vdc which is obtained by conducting the voltage division on the power supply voltage Vd supplied from the DC power supply 10 to drive the three-phase brushless motor with the division resistors 11 and 12. The power supply voltage detection comparator 1g is adapted to output an overvoltage signal if the power supply voltage Vd is at least an overvoltage which is set to be higher than the threshold of the power supply voltage detection AD converter 1i.

The energization control circuit 1h is adapted to output the control signal for intercepting the supply of the power supply voltage Vd to the three-phase brushless motor 3 in response to the overvoltage signal.

An example of operation of the brushless motor drive system 100 having the configuration described heretofore will now be described.

FIG. 3 is a diagram showing a relation between the deceleration control of the three-phase brushless motor and the power supply voltage in a brushless motor drive system in a comparative example.

As shown in FIG. 3, first, between time t0 and t1 in FIG. 3, the three-phase brushless motor 3 starts deceleration with the sine wave signals U, V and W which are output from the power device 2 in response to a speed command which sets a target rotation speed lower than the current rotation speed. If consequently a regenerated voltage is generated, then the power supply voltage Vd rises.

At time t1 in FIG. 3, the rotation speed of the three-phase brushless motor 3 becomes a target rotation speed which is set by the speed command and current regeneration to the DC power supply vanishes, and consequently the power supply voltage falls (between time t0 and t1).

Thus, in the brushless motor drive system in the comparative example, a current is regenerated to the power supply and the power supply voltage rises at the time of deceleration of the sine wave drive of the three-phase brushless motor. In other words, the comparative example has a problem that a power supply and parts which are high in withstand voltage must be used considering the variation of the power supply voltage and the variation of the power supply voltage exerts an influence upon the operation of the brushless motor as well.

Figure 5:
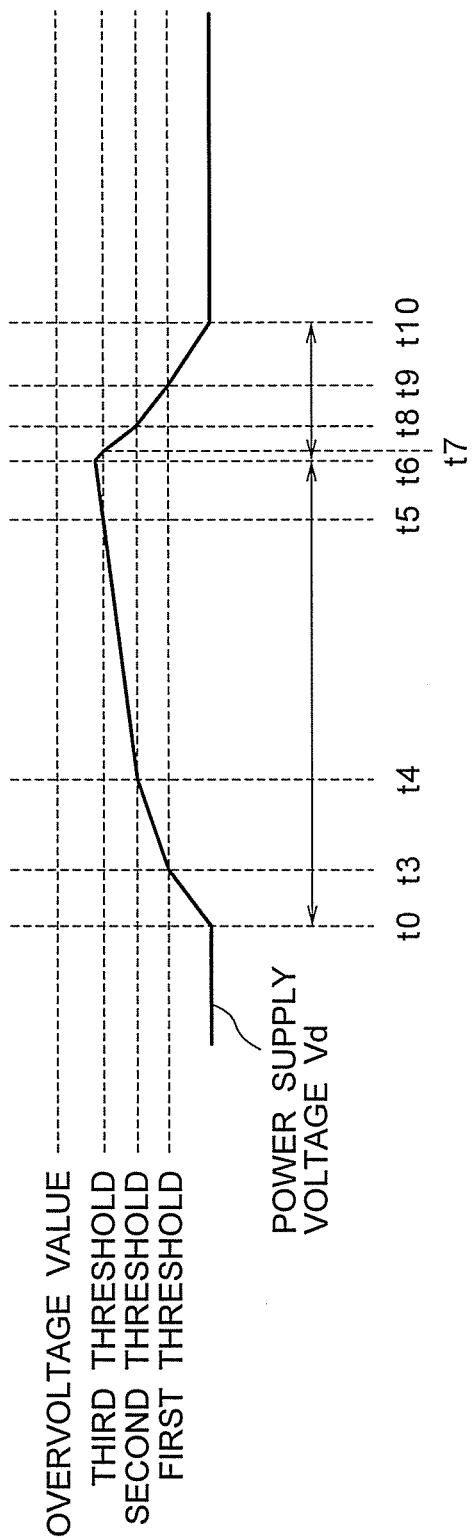
FIG. 5 is a diagram showing a relation between the deceleration control of the three-phase brushless motor and the power supply voltage in the brushless motor drive system 100 shown in FIG. 1.

On the other hand, FIG. 4 is a diagram showing an example of a relation between a control state of the brushless motor drive circuit 100 and the power supply voltage. FIG. 5 is a diagram showing a relation between the deceleration control of the three-phase brushless motor and the power supply voltage in the brushless motor drive system 100 shown in FIG. 1. Note that in FIG. 4, the lead angle of the energization timing is defined. As for the lag angle of the energization timing as well, however, definition is conducted as already described.

First, before time t0 in FIG. 5, the power supply voltage Vd is less than a first threshold and consequently the power supply voltage detection AD converter 1i outputs a prescribed digital signal. In this case, the energization timing setting circuit 1e sets energization timing (ordinary lead angle (FIG. 4)) of the three-phase brushless motor 3 on the basis of the phase of the three-phase brushless motor 3 which is estimated by the phase estimation circuit 1d.

Then, between time t0 and t3 in FIG. 5, the three-phase brushless motor 3 starts deceleration with the sine wave signals U, V and W which are output from the power device 2 in response to a speed command which sets a target rotation speed lower than the current rotation speed. If consequently a regenerated voltage is generated, then the power supply voltage Vd rises. Note that an inclination of the rise of the power supply voltage Vd at this time becomes equal to the inclination of the rise of the power supply voltage in the comparative example.

If the power supply voltage Vd becomes at least the first threshold at time t3 in FIG. 5, then the power supply voltage detection AD converter 1l outputs a digital signal corresponding to a first lead angle value.

In this case, the energization timing setting circuit 1e sets energization timing obtained by changing the ordinary lead angle by the first lead angle value (first step of lead angle in FIG. 4) on the basis of the adjustment signal, to further decelerate the three-phase brushless motor 3. Note that an inclination of the rise of the power supply voltage Vd at this time becomes less than the inclination of the rise of the power supply voltage in the comparative example. In other words, the rise of the power supply voltage Vd is suppressed.

If the power supply voltage Vd is at least a second threshold which is higher than the first threshold at time t4 in FIG. 5, then power supply voltage detection AD converter 1i outputs a second digital signal corresponding to a second lead angle value which leads the first lead angle value.

In this case, the energization timing setting circuit 1e sets energization timing obtained by changing the ordinary lead angle by the second lead angle value (second step of lead angle in FIG. 4) on the basis of the adjustment signal, to further decelerate the three-phase brushless motor 3. Note that an inclination of the rise of the power supply voltage Vd at this time becomes further less than the inclination of the rise of the power supply voltage in the comparative example. In other words, the rise of the power supply voltage Vd is further suppressed.

If the power supply voltage Vd is at least a third threshold which is higher than the second threshold at time t5 in FIG. 5, then power supply voltage detection AD converter 1$i$ outputs a third digital signal corresponding to a third lead angle value which leads the second lead angle value.

In this case, the energization timing setting circuit 1$e$ sets energization timing obtained by changing the ordinary lead angle by the third lead angle value (third step of lead angle in FIG. 4) on the basis of the adjustment signal, to further decelerate the three-phase brushless motor 3. Note that an inclination of the rise of the power supply voltage Vd at this time becomes further less than the inclination of the rise of the power supply voltage in the comparative example. In other words, the rise of the power supply voltage Vd is further suppressed.

At time t6 in FIG. 5, the rotation speed of the three-phase brushless motor 3 becomes a target rotation speed which is set by the speed command and current regeneration to the DC power supply 10 vanishes, and consequently the power supply voltage falls (between time t6 and t10). Note that also in the case where the power supply voltage Vd falls, the inclination of the fall of the power supply voltage Vd changes according to the lead angle value.

The above-described time t6 is earlier than the time t1 shown in FIG. 3. In other words, in the brushless motor drive system 100 according to the first embodiment, the time required for the rotation speed of the three-phase brushless motor 3 to decelerate to the target rotation speed in accordance with the speed command can be shortened. As a result, the power supply voltage Vd returns to a predetermined value quickly. Therefore, the brushless motor drive system 100 according to the first embodiment can drive the three-phase brushless motor 3 more suitably.

Note that if the power supply voltage Vd exceeds the overvoltage value (FIG. 4), then the power supply voltage detection comparator 1$g$ outputs the overvoltage signal. And the energization control circuit 1$h$ outputs the control signal for intercepting the supply of the power supply voltage Vd to the three-phase brushless motor 3, in response to the overvoltage signal. Furthermore, the output waveform generation circuit 1$f$ is adapted to output the drive signals SU, SX, SV, SY, SW and SZ to intercept the three-phase brushless motor 3 from the DC power supply 10 in response to a control signal which is output from the energization control circuit 1$h$ and which will be described later. Note that for intercepting the three-phase brushless motor 3 from the DC power supply 10, for example, all coils in the three-phase brushless motor 3 may be intercepted from the DC power supply 10, or all coils included in the three-phase brushless motor 3 may be grounded or driven with a square wave.

As already described, if the power supply voltage Vd rises due to generation of a regeneration voltage generated by decelerating the three-phase brushless motor 3 with the sine wave signals U, V and W, then the brushless motor drive circuit 1 increases power dissipated by the three-phase brushless motor 3 by increasing the lead angle value of the energization timing (advancing the lead angle) or increasing the lag angle value (delaying the lag angle).

As a result, regeneration of the current to the DC power supply 10 can be suppressed and the three-phase brushless motor 3 can be decelerated. In other words, the rise of the power supply voltage Vd can be suppressed.

The rise of the power supply voltage Vd is suppressed by suppressing the regeneration of the current to the DC power supply 10 as heretofore described. As a result, the three-phase brushless motor 3 becomes less in operation variation and can a desired operation.

Furthermore, since the rise of the power supply voltage Vd is suppressed, it becomes unnecessary to use the power supply and constituent parts which are large in withstand voltage in the brushless motor drive system 100.

Furthermore, since the brushless motor drive circuit 1 is formed of hard logics, the operation continuity becomes high and use is facilitated as compared with the case where the brushless motor drive circuit 1 is formed of software.

According to the brushless motor drive circuit in the first embodiment, the brushless motor can be driven more suitably while suppressing the variation of the power supply voltage caused by the regeneration when the brushless motor is decelerated as described heretofore.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A brushless motor drive circuit driving a three-phase brushless motor with sine wave signals, the brushless motor drive circuit comprising:

a first AD converter which converts a voltage value depending upon a power supply voltage supplied from a power supply to drive a three-phase brushless motor, to a digital signal and outputs the digital signal;

an energization timing adjustment circuit which outputs an adjustment signal for adjusting a lead angle value or a lag angle value of energization timing of the three-phase brushless motor, in response to the digital signal which is output by the first AD converter; and an energization timing setting circuit which sets the energization timing of the three-phase brushless motor, wherein if a regenerated voltage is generated by decelerating the three-phase brushless motor with sine wave signals and the power supply voltage rises, then the energization timing setting circuit sets energization timing changed by the lead angle value or the lag angle value on the basis of the adjustment signal to further decelerate the three-phase brushless motor, wherein if the power supply voltage is at least a preset threshold, then the first AD converter outputs a digital signal, and wherein if the power supply voltage is at least a first threshold, then the first AD converter outputs a first digital signal corresponding to a first lead angle value or a first lag angle value, and if the power supply voltage is at least a second threshold which is higher than the first threshold, then the first AD converter outputs a second digital signal corresponding to a second lead angle value which leads the first lead angle value or a second lag angle value which lags behind the first lag angle value.

2. The brushless motor drive circuit according to claim 1, wherein the thresholds of the first AD converter can be changed.

3. The brushless motor drive circuit according to claim 1, further comprising:

a power supply voltage detection comparator which is adapted to output an overvoltage signal if the power supply voltage is at least an overvoltage, the overvoltage being set to be higher than the threshold; and an energization control circuit which outputs the control signal to intercept the three-phase brushless motor from the power supply in response to the overvoltage signal.

4. The brushless motor drive circuit according to claim 3, wherein the energization control circuit outputs the control signal to ground all coils included in the three-phase brushless motor in response to the overvoltage signal.

5. The brushless motor drive circuit according to claim 1, wherein the voltage value is a divided voltage obtained by dividing the power supply voltage.

6. The brushless motor drive circuit according to claim 1, further comprising:

an energization timing detection circuit which detects a current flowing through the power device and outputs a detected signal depending upon a magnitude of the detected current; and a second AD converter which converts the detected signal to a digital signal and output the digital signal, wherein the energization timing adjustment circuit outputs an adjustment signal for adjusting the lead angle value or the lag angle value of energization timing of the three-phase brushless motor, in response to the digital signal output by the first AD converter and the digital signal output by the second AD converter.

7. The brushless motor drive circuit according to claim 6, wherein the energization timing adjustment circuit adds up the digital signal output by the first AD converter and the digital signal output by the second AD converter, and outputs an obtained result as the adjustment signal.

8. The brushless motor drive circuit according to claim 7, wherein the energization timing adjustment circuit is an adder, the adder adding up the digital signal output by the first AD converter and the digital signal output by the second AD converter, and outputting an obtained result as the adjustment signal.

9. The brushless motor drive circuit according to claim 1, further comprising an output waveform generation circuit which outputs drive signals for driving the three-phase brushless motor on the basis of the energization timing set by the energization timing setting circuit.

10. A brushless motor drive system comprising:
a three-phase brushless motor;
a power supply which generates a power supply voltage;
a power device which supplies the power supply voltage to the three-phase brushless motor with three-phase sine wave signals; and
a brushless motor drive circuit which controls the power device,
wherein the brushless motor drive circuit comprising:
a first AD converter which converts a voltage value depending upon a power supply voltage supplied from a power supply to drive a three-phase brushless motor, to a digital signal and outputs the digital signal;
an energization timing adjustment circuit which outputs an adjustment signal for adjusting a lead angle value or a lag angle value of energization timing of the three-phase brushless motor, in response to the digital signal which is output by the first AD converter; and an energization timing setting circuit which sets the energization timing of the three-phase brushless motor, wherein if a regenerated voltage is generated by decelerating the three-phase brushless motor with sine wave signals and the power supply voltage rises, then the energization timing setting circuit sets energization timing changed by the lead angle value or the lag angle value on the basis of the adjustment signal to further decelerate the three-phase brushless motor, wherein if the power supply voltage is at least a preset threshold, then the first AD converter outputs a digital signal, and wherein if the power supply voltage is at least a first threshold, then the first AD converter outputs a first digital signal corresponding to a first lead angle value or a first lag angle value, and if the power supply voltage is at least a second threshold which is higher than the first threshold, then the first AD converter outputs a second digital signal corresponding to a second lead angle value which leads the first lead angle value or a second lag angle value which lags behind the first lag angle value.

11. The brushless motor drive system according to claim 10, wherein the thresholds of the first AD converter can be changed.

12. The brushless motor drive system according to claim 10, further comprising:

a power supply voltage detection comparator which is adapted to output an overvoltage signal if the power supply voltage is at least an overvoltage, the overvoltage being set to be higher than the threshold; and an energization control circuit which outputs the control signal to intercept the three-phase brushless motor from the power supply in response to the overvoltage signal.

13. The brushless motor drive system according to claim 12, wherein the energization control circuit outputs the control signal to ground all coils included in the three-phase brushless motor in response to the overvoltage signal.

14. The brushless motor drive system according to claim 10, wherein the voltage value is a divided voltage obtained by dividing the power supply voltage.

15. The brushless motor drive system according to claim 10, further comprising:

an energization timing detection circuit which detects a current flowing through the power device and outputs a detected signal depending upon a magnitude of the detected current; and a second AD converter which converts the detected signal to a digital signal and output the digital signal, wherein the energization timing adjustment circuit outputs an adjustment signal for adjusting the lead angle value or the lag angle value of energization timing of the three-phase brushless motor, in response to the digital signal output by the first AD converter and the digital signal output by the second AD converter.

16. The brushless motor drive system according to claim 15, wherein the energization timing adjustment circuit adds up the digital signal output by the first AD converter and the digital signal output by the second AD converter, and outputs an obtained result as the adjustment signal.

* * * * *